United States Patent [19]

Powaska

[11] 4,025,098
[45] May 24, 1977

[54] BUMPER ASSEMBLY FOR A MOTOR VEHICLE

[76] Inventor: Tadeusz Powaska, 166 Adelaide Ave. E., Oshawa, Ontario, Canada

[22] Filed: May 22, 1975

[21] Appl. No.: 579,974

[52] U.S. Cl. .................... 293/30; 293/62; 293/84; 293/89
[51] Int. Cl.² ........................ B60R 19/02
[58] Field of Search ........... 293/30, 73, 84–86, 293/62, 88–89, DIG. 5; 213/8

[56] References Cited

UNITED STATES PATENTS

| 1,375,574 | 4/1921 | Dodson | 293/30 |
|---|---|---|---|
| 1,637,152 | 7/1927 | Kehrer | 293/84 |
| 1,691,398 | 11/1928 | Long | 293/30 X |
| 1,696,472 | 12/1928 | Conti | 293/30 UX |
| 3,333,880 | 8/1967 | Tavano, Sr. | 293/30 |
| 3,390,787 | 7/1968 | Grumblatt | 213/8 |

FOREIGN PATENTS OR APPLICATIONS

| 1,019,069 | 10/1952 | France | 293/30 |
|---|---|---|---|
| 897,191 | 5/1944 | France | 293/73 |
| 141,977 | 6/1930 | Germany | 293/30 |
| 644,056 | 8/1962 | Italy | 293/30 |
| 267,209 | 3/1927 | United Kingdom | 293/30 |

Primary Examiner—Stanley H. Tollberg
Assistant Examiner—Charles A. Marmor

[57] ABSTRACT

A bumper assembly for a motor vehicle includes a pair of movable side bumpers adapted to be received by the sides of the automobile. A movable rear and forward bumper are joined in tandem to each other. A pair of first bumper rods welded to the forward bumper extend rearwardly into a pair of channel bar members affixed onto the frame of the motor vehicle. A pair of second bumper rods welded to the rear bumper extend forwardly into the channel bar member. A shock absorbing mechanism communicates between each set of first and second rod within each said channel bar member.

4 Claims, 6 Drawing Figures

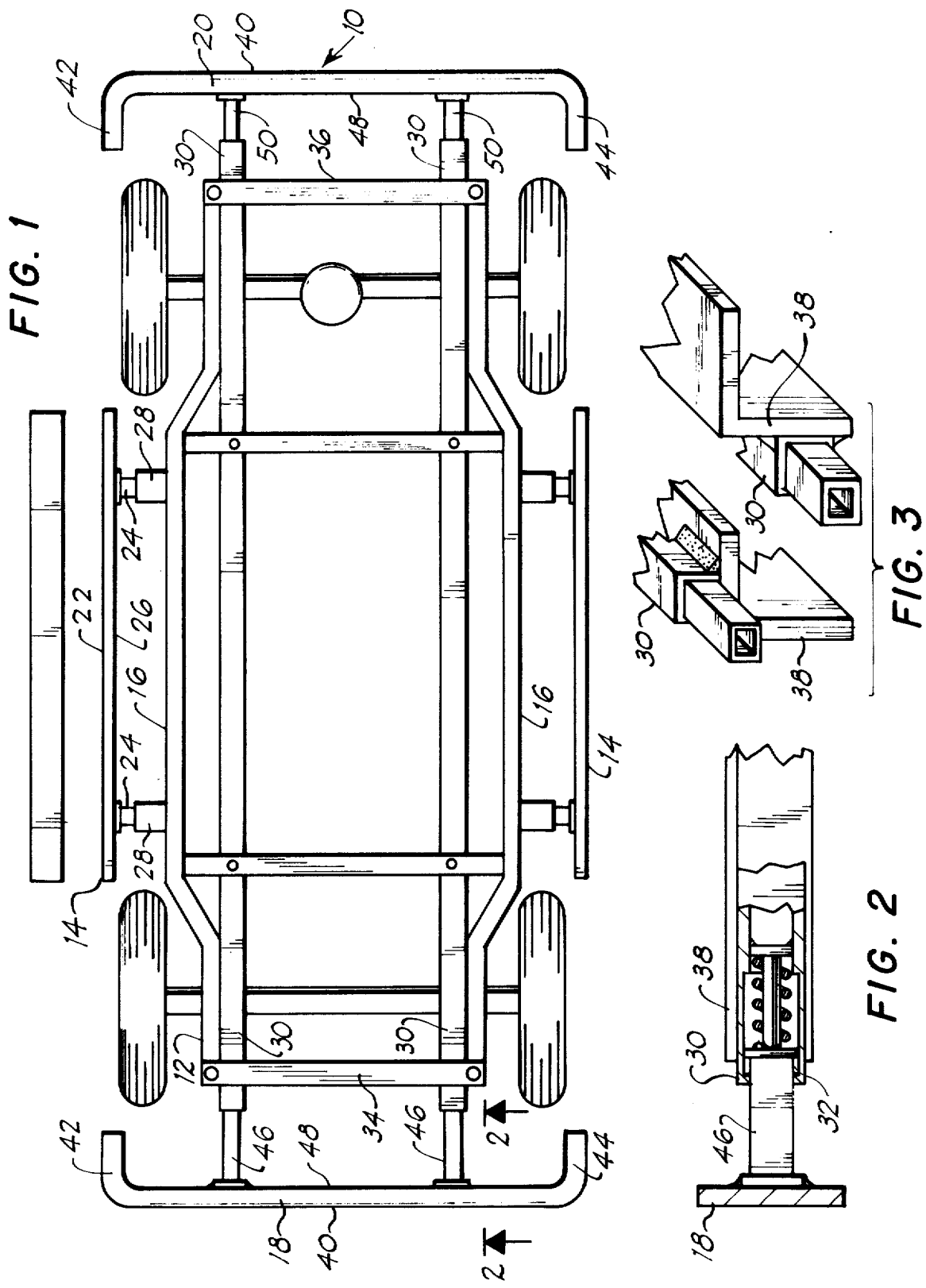

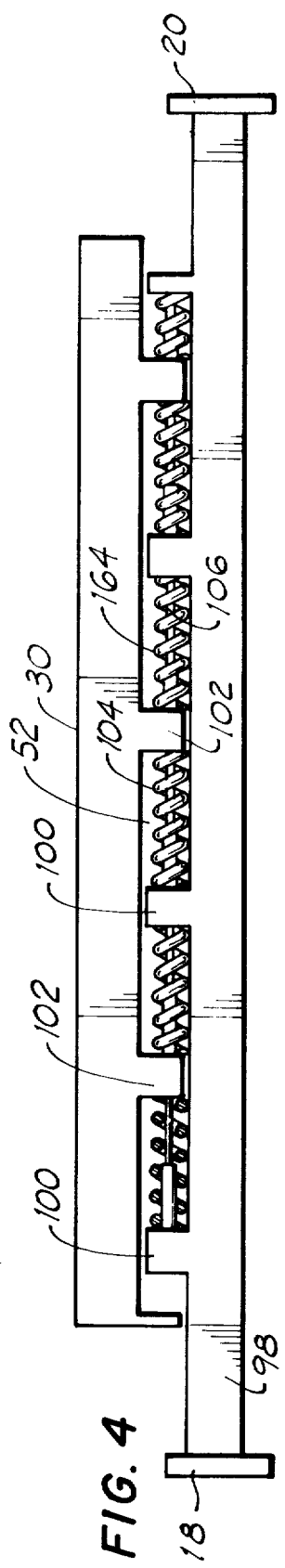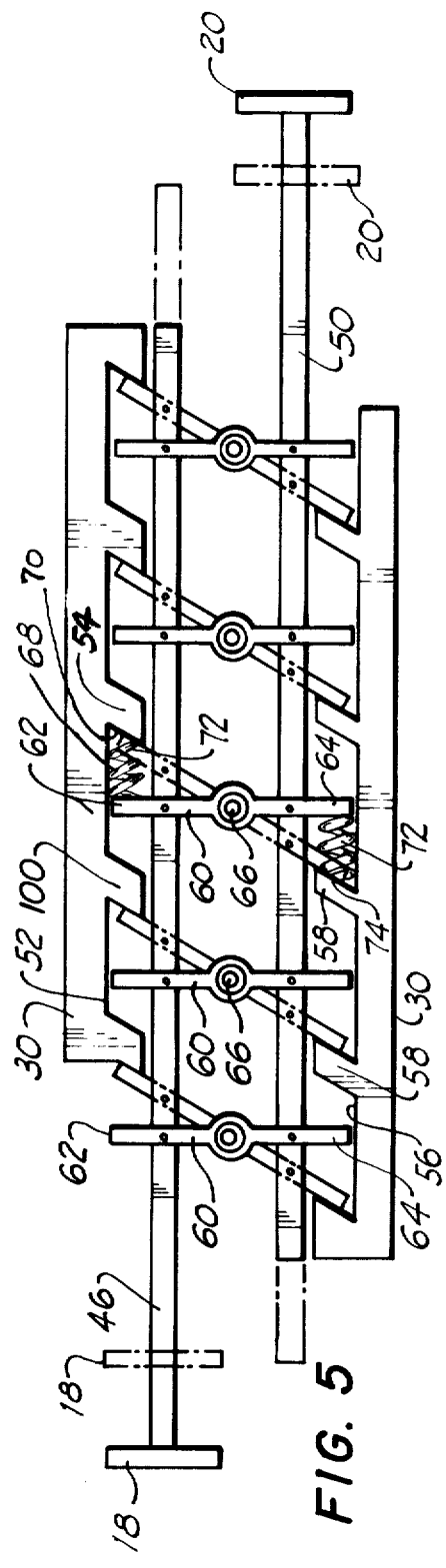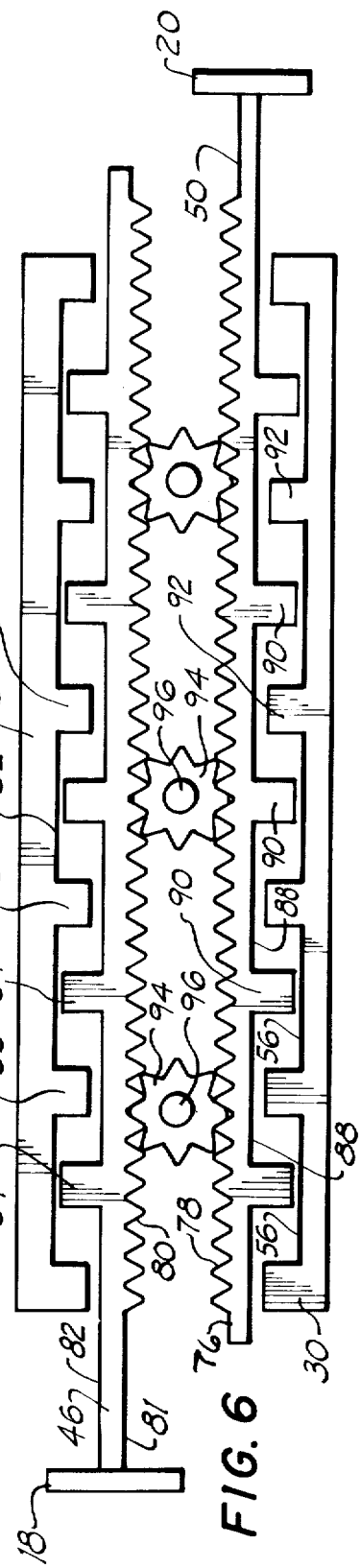

BUMPER ASSEMBLY FOR A MOTOR VEHICLE

SUMMARY OF THE INVENTION

My present invention relates to a unique and novel safety bumper assembly for a motor vehicle.

A number of U.S. Pat. Nos. 2,986,419; 3,307,867; and 3,718,357 have employed variously designed bumpers for a motor vehicle, but these aforementioned patents are non-applicable to my present invention.

An object of my present invention is to provide a bumper assembly for a motor vehicle capable of providing means for reducing damage to the motor vehicle as well as injury to the occupants of the motor vehicle.

A further object of my present invention is to provide a safety bumper assembly of simple design that is readily adaptable to existing motor vehicles.

Briefly, my present invention comprises a pair of movable side bumpers adapted to be received by the sides of the automobile. A movable rear and forward bumper are joined in tandem to each other. A pair of first bumper rods welded to the forward bumper extend rearwardly into a pair of channel bar members affixed onto the frame of the motor vehicle. A pair of second bumper rods welded to the rear bumper extend forwardly into the channel bar member. A shock absorbing mechanism communicates between each set of first and second rod within each said channel bar member.

BRIEF DESCRIPTION OF THE DRAWINGS

The objects and features of the invention may be understood with reference to the following detailed description of an illustrative embodiment of the invention, taken together with the accompanying drawings in which:

FIG. 1 illustrates a bottom view of a bumper assembly for a motor vehicle;

FIG. 2 illustrates a side cutaway view of the bumper assembly taken along line 2—2 of FIG. 1;

FIG. 3 illustrates a perspective view of a channel member of the member assembly affixed onto the frame of the motor vehicle;

FIG. 4 illustrates a side cross sectional view of a first embodiment of a shock absorbing means;

FIG. 5 illustrates a side cross sectional view of a second embodiment of the shock absorbing means; and FIG. 6 illustrates a side cross sectional view of a third embodiment of the shock absorbing means.

DESCRIPTION OF THE PREFERRED EMBODIMENT

Turning now descriptively to the drawings, in which similar reference characters denote similar elements throughout the several views, FIG. 1 shows a bumper assembly 10 for a motor vehicle 12 having a pair of side movable bumpers 14 affixed onto the sides 16 of the motor vehicle 12 as well as a forward 18 and a rear 20 bumper, wherein bumpers 18, 20 work in a tandem with each other.

Each side bumper 14 comprises an elongated bar member 22. A pair of rod members 24 are welded onto the interior face 26 of each bar member 22, wherein the rod members 24 are slidably contained in spring loaded receiving members 28 mounted onto the sides 16 of the motor vehicle.

FIGS. 1–3 show the forward 18 and rear 20 bumper of the bumper assembly 10. The assembly 10 comprises a pair of elongated channel bar members 30, each having a continuous passageway 32 therethrough, wherein members 30 extend from the forward end 34 to the rear end 36 of the motor vehicle 12. Each channel member 30 is mounted onto the bottom frame 38 of the motor vehicle 12. The channel member 30 can be mounted on top of or on the side of the frame 38 as shown in FIG. 3 to accommodate the height of the bumpers 18, 20 from the ground. The forward 18 and rear 20 bumpers each comprise an elongated center section 40 having a pair of distal hooked ends 42, 44. A pair of first bumper rods 46 are welded to the interior face 48 of the center section 40 of the forward bumper 18, wherein the rods 46 extend rearwardly into the channel bar members 30. A pair of second bumper rods 50 are welded to the interior face 48 of the center section 40 of the rear bumper 20, wherein bumper rods 50 extend forwardly into the channel bar members 30. A shock absorbing means is provided between each set of bumper rods 46, 50 within each channel bar member 30 so as to absorb the impack shock on the bumpers 18, 20 uniformly over the entire frame 38 of the motor vehicle 12 as shown in FIGS. 5, 6.

FIG. 5 shows a second embodiment of the shock absorbing means. The top interior face 52 of the channel bar member 30 has a plurality of spaced downward extending stop members 100 angled in a forwardly direction. The bottom interior face 56 of the channel bar member 30 has a plurality of spaced upwardly extending stop members 58 angled in a rearwardly direction. A plurality of transverse bar members 60 each having a pair of distal ends 62, 64 and having a pin 66 centrally therethrough are rotatably mounted within the channel bar member 30. Each bar member 60 is rotatably joined onto each bumper rod 46, 50. One distal end 62 of each member 60 is joined by a first spring member 68 to the forward slanted edge 70 of one of the stop members 54. The other distal end 64 of each member 60 is joined by a second spring member 72 to a rear slanted edge 74 of one of the stop members 58. As the forward bumper 18 is compressed inward, the rear bumper 20 is pulled inward.

FIG. 6 shows a third embodiment of the shock absorbing means. The top surface 76 of the second bumper rod 50 has a plurality of first gear teeth 78 thereon. The bottom surface 81 of the first bumper rod 46 has a plurality of second gear teeth 80 thereon. The top surface 82 of the first bumper rod 46 has a plurality of upwardly extending spaced first stop elements 84 upwardly from the top surface 82. A plurality of first stop member 86 extend downwardly from the top interior face 52 of the channel bar member 30, wherein each element 84 is positioned between two members 86. The bottom surface 88 of the second bumper rod 50 has a plurality of downwardly extending spaced second stop elements 90 extending downwardly from the bottom surface 88. A plurality of second stop members 92 extend upwardly from the bottom interior face 56 of the channel bar member 30, wherein each element 90 is positioned between two members 92. A plurality of ratchet wheels 94 rotatably mounted on pin members 96 engage the gear teeth 78, 80.

FIG. 4 shows a first embodiment of the shock abosrbing means, wherein one bumper rod 98 communicates between the forward 18 and rear 20 bumpers. A plurality of stop elements 100 extend upwardly from the rod 98, wherein each element has a hole therethrough. A plurality of stop members 102 each having an opening therethrough extend downwardly from the top interior surface 52 of channel bar member 30, wherein each element 100 is positioned between two members 102. A coil spring 104 is positioned between each element 100 and each member 102. A rod member 106 extends through the coil springs 104 and the holes of elements 100 and opening of members 102 so as to hold the springs 104 in position.

Hence, obvious changes may be made in the specific embodiment of the invention described herein, such modifications being within the spirit and scope of the invention claimed, it is indicated that all matter contained herein is intended as an illustrative and not as limiting in scope.

Having thus described the invention, what I claim as new and desire to secure by Letters Patent of the United States is:

1. A bumper assembly for a motor vehicle, which comprises:
   a. a forward bumper:
   b. a rear bumper;
   c. a pair of channel bar members adapted to be received on a frame of said motor vehicle;
   d. a pair of first bumper rods welded to said forward bumper, said first bumper rods slidably contained in said channel bar members;
   e. a pair of second bumper rods welded to said rear bumper, said second bumper rods slidably contained in said channel bar members;
   f. a plurality of first gear teeth contained on a top surface of said second bumper rod;
   g. a plurality of second gear teeth contained on a bottom surface of said first bumper rod;
   h. a plurality of first spaced stop elements extending upwardly from a top surface of said first bumper rod;
   i. a plurality of second spaced stop elements extending downwardly from a bottom surface of said second bumper rod;
   j. a plurality of first stop members extending downwardly from a top interior surface of said channel member, one said first stop element positioned between each two said first stop members;
   k. a plurality of second stop members extending upwardly from a bottom interior surface of said channel member, one said second stop element positioned between each two said second stop members; and
   l. a plurality of ratchet wheels rotatably contained within said channel bar member, each said ratchet wheel engaging said first and said second gear teeth.

2. A bumper assembly for a motor vehicle as recited in claim 1, wherein a side movable bumper is received on each side of said motor vehicle.

3. A bumper assembly for a motor vehicle, which comprises:
   a. a forward bumper;
   b. a rear bumper;
   c. a pair of channel bar members adapted to be received on a frame of said motor vehicle;
   d. a pair of first bumper rods welded to said forward bumper, said first bumper rods slidably contained in said channel bar members;
   e. a pair of second bumper rods welded to said rear bumper, said second bumper rods slidably contained in said channel bar members;
   f. a plurality of spaced downwardly extending stop members having slanted forward edges affixed onto a top interior surface of each said channel bar member;
   g. a plurality of spaced upwardly extending stop members having slanted rear edges affixed onto a bottom interior surface of each said channel bar members;
   h. a plurality of transverse bar members having distal ends rotatably mounted within said channel bar members, each said transverse member rotatably joined onto said first and said second bumper rods contained in each said channel bar members, each said rod joined to said transverse bar halfway between one said distal end and a midpoint of said transverse bar;
   i. a first spring member affixed between one said distal end and each said slanted forward edge of each said downward extending stop members; and
   j. a second spring member affixed between said other distal end and each said slanted rear edge of each said upward extending stop member.

4. A bumper assembly for a motor vehicle as recited in claim 3, wherein a side movable bumper is received on each side of said motor vehicle.

* * * * *